US009363462B2

(12) United States Patent
Yoel

(10) Patent No.: US 9,363,462 B2
(45) Date of Patent: Jun. 7, 2016

(54) SYSTEM AND METHOD FOR SIMULTANEOUS DISPLAY OF MULTIPLE GEO-TAGGED VIDEOS OF A PARTICULAR GEOGRAPHICAL LOCATION

(71) Applicant: David Yoel, Radnor, PA (US)

(72) Inventor: David Yoel, Radnor, PA (US)

( * ) Notice: Subject to any disclaimer, the term of this patent is extended or adjusted under 35 U.S.C. 154(b) by 126 days.

(21) Appl. No.: 14/079,105

(22) Filed: Nov. 13, 2013

(65) Prior Publication Data

US 2014/0133824 A1      May 15, 2014

Related U.S. Application Data

(60) Provisional application No. 61/725,744, filed on Nov. 13, 2012.

(51) Int. Cl.
| | |
|---|---|
| *H04N 5/765* | (2006.01) |
| *G11B 27/10* | (2006.01) |
| *F17D 5/02* | (2006.01) |
| *G01C 11/00* | (2006.01) |
| *G06F 17/30* | (2006.01) |
| *H04N 5/76* | (2006.01) |
| *H04N 9/82* | (2006.01) |
| *G11B 27/34* | (2006.01) |

(52) U.S. Cl.
CPC .................. *H04N 5/765* (2013.01); *F17D 5/02* (2013.01); *G01C 11/00* (2013.01); *G06F 17/30* (2013.01); *G06F 17/30241* (2013.01); *G11B 27/10* (2013.01); *G11B 27/105* (2013.01); *G11B 27/34* (2013.01); *H04N 5/76* (2013.01); *H04N 9/8205* (2013.01)

(58) Field of Classification Search
CPC ........... H04N 5/04; H04N 5/765; H04N 5/76; H04N 9/8205; G11B 27/10; G11B 27/105; G11B 27/34; G11B 27/00; F17D 5/02; G01C 11/00; G06F 17/30; G06F 17/30241
USPC ............. 386/201, 212, 226, 234, 299, E5.002
See application file for complete search history.

(56) References Cited

U.S. PATENT DOCUMENTS

| | | | |
|---|---|---|---|
| 5,045,937 | A | 9/1991 | Myrick |
| 5,633,946 | A | 5/1997 | Lachinski et al. |
| 6,243,483 | B1 * | 6/2001 | Petrou et al. .................. 382/103 |
| 6,766,226 | B2 | 7/2004 | Andersen |
| 2009/0009605 | A1 * | 1/2009 | Ortiz .............................. 348/157 |
| 2009/0186628 | A1 * | 7/2009 | Yonker et al. ............... 455/456.1 |
| 2011/0007962 | A1 * | 1/2011 | Johnson et al. ............... 382/154 |

OTHER PUBLICATIONS

Slaymaker, Using Georeferenced Large-Scale Aerial Videography As a Surrogate for Ground Validation Data, Winrock—Remote sensing for forest environments, Chapter 8, p. 474 (2003).

* cited by examiner

*Primary Examiner* — Thai Tran
*Assistant Examiner* — Nien-Ru Yang
(74) *Attorney, Agent, or Firm* — Ober, Kaler, Grimes & Shriver; Royal W. Craig

(57) ABSTRACT

A master-slave video playback interface in which a master video player is time based, and a slave video player displays a second video georeferenced to the first, e.g., the georeferenced frames of the second video in closest proximity to those being shown on the master player. The invention allows more efficient simultaneous viewing of multiple geo-tagged videos acquired at a singular geographical location, to compare videos, for example, collected on an oil or gas pipeline Right Of Way (ROW) at different times to monitor encroaching threats to pipeline integrity.

11 Claims, 2 Drawing Sheets

US 9,363,462 B2

SYSTEM AND METHOD FOR SIMULTANEOUS DISPLAY OF MULTIPLE GEO-TAGGED VIDEOS OF A PARTICULAR GEOGRAPHICAL LOCATION

CROSS-REFERENCE TO RELATED APPLICATION(S)

The present application derives priority from U.S. provisional patent application 61/725,744 filed 13 Nov. 2012.

BACKGROUND OF THE INVENTION (1) Field of the Invention

The present invention relates to airborne imaging software and, more particularly, to a software system and method for simultaneous display of multiple geo-tagged videos acquired at a particular geographical location at different times. The invention is especially useful for dual-or-multiple displays of videos collected on an oil or gas pipeline Right Of Way (ROW) at different times to monitor encroaching threats to pipeline integrity.

(2) Description of Prior Art

Federal regulation requires that pipeline operators monitor their right of ways in an effort to prevent accidental damage to the pipeline and to detect leaks. As a result, oil and natural gas pipeline companies regularly monitor hundreds of thousands of miles of pipeline in the continental United States, and more on a multi-national scale. This is no small task. Conventional monitoring entails flying pilot/observers in light aircraft over the pipeline. The routine occurs usually at two week intervals. The aircraft flies at low altitude (300 ft to 500 ft) and the pilot, observer or both visually inspect the right of way.

The current industry practice is to have the pilot/observer inspect and document observations on paper. There would be great benefit if technology could be used to collect aerial data and: a) create a record of the condition of the ROW for process improvement purposes; and b) develop techniques for automatically detecting threats to pipeline integrity such as encroaching machinery. An emerging trend is to have the aircraft collect aerial imagery data for later viewing. This often involves stabilized aerial imaging using collection systems that correlate the imagery with geographic information. Geographic Information System (GIS) video integrates spatial location information with the video to help the viewer interpret the information. For example, U.S. Pat. No. 5,633, 946 to Lachinski et al. (Geospan Corporation) issued May 27, 1997 shows an early method and apparatus for collecting and processing visual and spatial position information from a moving vehicle. This patent teaches how to record for each frame of the video both the time code and current spatial position information provided by a GPS receiver and inertial data from an IMU. In this way, each recorded video image can be correlated with the spatial position of the camera at the time the image was recorded.

After the flight, sitting at a computer, an analyst can replay the video, observe any issues, and identify the location of those issues. However, the analyst remains at a disadvantage if asked to compare two georeferenced videos taken at different times to determine if the observed issue represents a change in the condition of the ROW. Currently, this requires the analyst to manually load the current video and an archived video and to manually maintain their geographic progression. This is complicated by the fact that an aircraft flown on different days experiences different wind speeds and directions. Consequently, it will always follow slightly different paths through the air, will always fly at different speeds, and will always experience different roll, pitch and yaw conditions as the aircraft progresses down the ROW. A more efficiently established side-by-side comparison is important to effectively monitor threats to pipeline integrity, machinery encroachments over time, or other temporal trends of interest such as vegetation patterns, drought monitoring, downed trees, deforestation, fire hazard monitoring, and soil erosion patterns. This is acknowledged by Slaymaker, *Using Georeferenced Large-Scale Aerial Videography As A Surrogate For Ground Validation Data*, Winrock—Remote sensing for forest environments, Chapter 8, page 474 (2003), who suggests a visual comparison between wide-angle video images and a false color-infrared of each satellite image to correctly identify the location of individual trees in the corresponding video.

There are a number of prior art references for comparing images in real-time as they are observed. For example, U.S. Pat. No. 5,045,937 to Myrick (Space Island Products) issued Sep. 3, 1991 shows a method for geographical surveying using multiple cameras to obtain split-screen images with overlaid geographical coordinates.

U.S. Pat. No. 6,766,226 to Andersen (Andersen Aeronautical Technologies) issued Jul. 20, 2004 shows a method of monitoring utility lines with aircraft using a dual sensor camera capable of concurrently capturing both thermal images and real time video images. The thermal images may be simultaneously reviewed with the video images for visual anomalies.

The foregoing and other known prior art synchronize videos as they are taken by applying a sync signal to the cameras, which is then used in playback to produce a split screen effect. However, video that has adequate resolution to identify threats requires a large amount of computer memory. For example, data collected on a recent flight test suggests that the video file size can exceed 5 gigabytes per mile. When considering that several hundred thousand miles are flown every two weeks, the data storage and review process rapidly compounds, and synchronization is useless for this.

Geotagging is the well-known process of adding geospatial metadata to digital media including still photographs and video, among others. The geospatial metadata usually includes latitude and longitude coordinates. There are several known formats used for recording these coordinates, the most common being degrees, minutes, and seconds (DMS). However, DMS format, coordinates can alternately be reported in "decimal degrees" (DD) that presents the minutes and seconds as a fraction of one degree.

It would be greatly advantageous to provide a master-slave video playback interface in which a master video player is time based, and a slave video player displays a second video georeferenced to the first, e.g., displaying the georeferenced frames of the second video in closest proximity to those being shown on the master player. This would allow more efficient simultaneous viewing of multiple geo-tagged videos acquired at a particular geographical location to compare videos collected at different times. This would be especially useful for dual-or-multiple displays of videos collected on an oil or gas pipeline Right Of Way (ROW) at different times to monitor encroaching threats to pipeline integrity.

SUMMARY OF THE INVENTION

Accordingly, it is an object of the present invention to provide a master-slave video playback interface comprising a time-based master video player and one or more slave video players each maintaining the geographical correlation over time to the master for displaying different videos georeferenced to the first.

It is another object to provide a video playback interface that facilitates more efficient simultaneous viewing of multiple geo-tagged videos acquired of a common geographical location to allow comparison to monitor encroachments to oil or gas pipeline Right of Ways (ROWs) over time.

It is another object of the invention to provide a video playback interface that facilitates more efficient simultaneous viewing of multiple geo-tagged videos acquired of a common geographical location to allow comparison to monitor encroachments to oil or gas pipeline Right Of Ways (ROWs) in real time in flight to aid the pilot/observer in identifying threats to pipeline integrity.

It is another object of the invention to provide an automatic playback method for multiple geo-tagged videos acquired at a common geographical location at a different time and maintaining that geographic correlation as the videos progress to enable automatic application of change detection algorithms to identify changes to pipeline integrity without the need for a human viewer.

It is another object of the invention to enable automatic application of change detection algorithms as described above to identify changes in real-time during flight.

In accordance with the foregoing and other objects, the present invention is a software system and method for simultaneous display of multiple geo-tagged videos acquired at a particular geographical location to compare videos and inertial measurement data collected at different times. The invention is especially useful for dual-or-multiple displays of videos collected on an oil or gas pipeline Right Of Way (ROW) at different times to monitor encroaching threats to pipeline integrity. The system comprises a master video player for playing a geo-tagged video in a separate window in real time, and a slave video player for playing a second geo-tagged video taken of the same location in a separate window. The slave video player correlates its display of frames based on geo-reference information rather than time, playing geo-tagged frames bearing the most similar longitude and latitude data to the current frame appearing in the master video player. Both master and slave modules can include a control interface displaying file particulars and video characteristics, current UTC time, and GPS longitude, latitude and elevation derived from geo-reference data attached to each frame. The control interface may convert the coordinate GPS data into adjusted longitude and latitude (arc values), and the master player controls the frame displayed in the slave player(s) so that the slave shows the frames most proximately georeferenced by adjusted longitude and latitude to that shown in the master. By playing the two side-by-side, one can more efficiently see changes over time and monitor for threats to pipeline integrity.

The invention includes a differential viewing mode in which the image presented in the slave player is subtracted from the image presented in the master player resulting in a difference image that is analyzed to determine if a threat condition exists. This threat analysis may be done during flight or post-flight, by human beings or automatically by algorithms on a computer.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
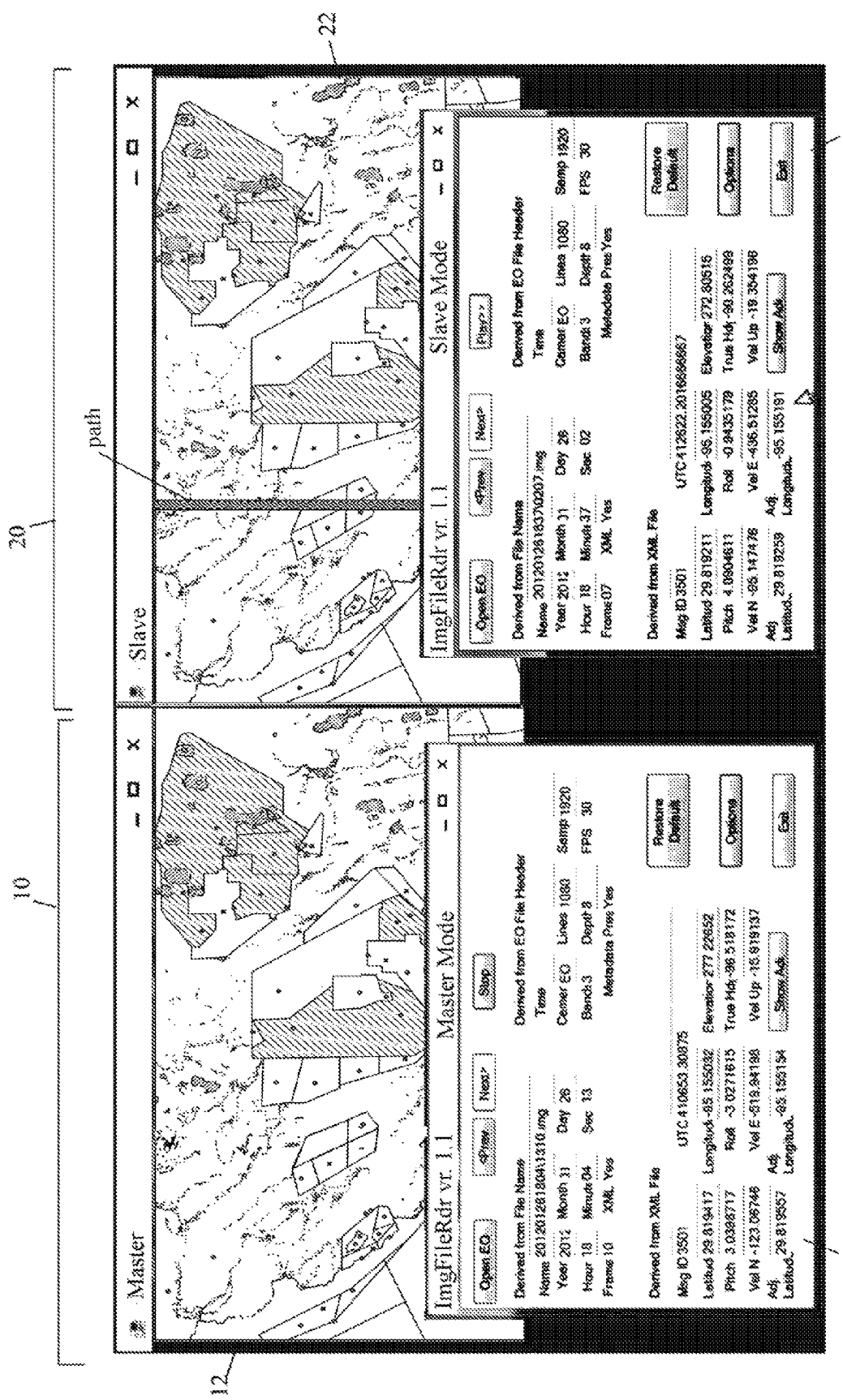
FIG. 1 is a screen shot of the video playback interface of the invention with time based master displaying a first video (left) and geo-synchronized slave displaying a second video (right).

The present invention is a software system and method for simultaneous geo-correlated display of multiple geo-tagged videos acquired at a particular geographical location at different times. This is especially useful for comparing two or more videos collected on an oil or gas pipeline Right Of Way (ROW) at different times, so as to monitor encroaching threats to pipeline integrity.

For purposes of this application the term "video" should be construed as any motion imagery as defined by the Motion Imagery Standards Board (MISB) which includes sequential or continuous streaming images at specified temporal rates (normally expressed as frames per second) that contain metadata. The metadata may be acquired synchronously or asynchronously. Asynchronous metadata is collected at the point of acquisition without regard to accurate alignment to a particular video frame. Synchronous metadata is collected in temporal alignment with the video stream (e.g., time stamped and associated to the imagery in a defined manner).

The system of the present invention may be implemented in a web-based computer network having a plurality of client computers connected via the internet. Any number of clients may participate. An exemplary client may include a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as a modem, digital subscriber line ("DSL") card, cable modem, network interface card, wireless network card, or other interface device capable of wired, fiber optic, or wireless data communications. For example, a suitable client may be a personal computer equipped with an operating system such as Microsoft Windows, UNIX, or Linux, along with software support for Internet communication protocols. The client includes at least one browser program, such as Microsoft Internet Explorer, Google Chrome™, Netscape Navigator™, Firefox™ or the like to provide a user interface for access to the general internet.

Users will typically access the system via a client computer by executing the software from within their existing web browser. For example, running the executable may download a rich internet application (RIA) plugin or initiate a Java-API executable application on client computer from within their browser. This displays a video playback interface comprising a master display 10 and one or more slave displays 20, each according to the native Windows™ GUI-based operating environment. The master display 10 further comprises a master video viewing window 12 and a master video control window 14. Similarly, each slave 20 includes a slave video viewing window 22 and a slave video control window 24. The master control window 14 includes a file selection control (at top) for selecting and loading an electro-optical/infra-red (EO/IR) camera video in any of a variety of formats (flv, mp4, mov, f4v, NTSC or PAL). The illustrated file selection control allowed navigation to and selection of the video shown in a filename window at path 201201261804/1310.img. The button at top (Open EO) loads and opens the video file, the <Prev> and <Next> buttons move through the video one frame at a time, and the <Stop> control stops playback. In addition to the filename, file particulars including the Year, Month, Day, Hour, Minute and Second of the currently-displayed video frame are shown, along with the frame number and an indication as to whether the file has a corresponding XML or not. The video characteristics (derived from the video file header) are shown at right and include camera type (EO), resolution (1080 lines), sample size 1920, length (hours 18, minutes 04, seconds 13), bands (3), depth (8) and frames-per-second (30). An indication as to whether there is embedded Metadata present (Yes) is also provided. The master video viewing window 12 displays the video listed in the master video control window 14 frame-by-frame at a conventional chronological frame rate. Meanwhile the frame-by-frame geotag information (assimilated from embedded metadata in each frame) is displayed at bottom: Msg ID: 350; UTC 410653.30875; Latitude −29.819417; Longitude −95.155032; Elevation 277.22652; Pitch 3.0398717; Roll −3.0271615; True Heading-96.518172; vector velocity (Vel N −123.06746; Vel E-519.94198; Vel Up-15.919137); and Adjusted Latitude (−29.819557) and Adjusted Longitude (5.155154).

The slave controller 24 also includes a file selection control for selecting and loading an electro-optical/infra-red (EO/IR) camera video file. For example, the illustrated slave is prepared to load a selected video filename shown in filename window at path 20120126183710207.img. Typically, a user will find and load a video file of the same pipeline survey as the master video file, but taken at a different time. As the master video plays frame-by-frame in the master video viewing window 22 the Adjusted Latitude (−29.819557) and Adjusted Longitude (5.155154) coordinates are communicated to the slave 20, and the slave player 20 calculates the geographically-closest frame from within the loaded file and plays that in slave video viewing window 22. Thus, the user is able to simultaneously view a first video in master window 12 and a second video in slave window 22 both collected along a geographical location such as an oil or gas pipeline Right Of Way (ROW), but at different times. This affords more contrast for encroaching threats to pipeline integrity. By playing two videos side-by-side, the user can more efficiently see changes over time and monitor for threats to pipeline integrity. Indeed, in the illustrated video (FIG. 1 right) a new bike path can be seen at 29.819066/−95.156748. On the left, when the pipeline was originally surveyed, there is no path.

The slave video player 20 correlates its display of frames based on georeference information (adjusted latitude and adjusted longitude) rather than time, playing geo-tagged frames bearing the most proximate adjusted longitude and adjusted latitude data to the current frame appearing in the master video player 10. The slave control window 24 includes the same control interface displaying the same particulars and video characteristics as the master control window 14.

Figure 2:
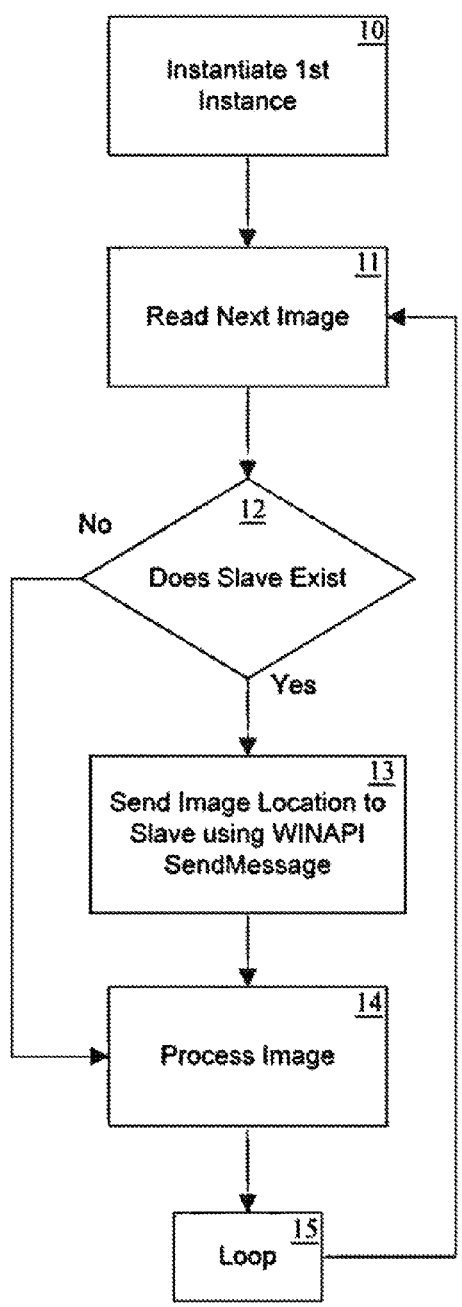
FIG. 2 is a block diagram of the software construct of the present invention.
Figure 2:
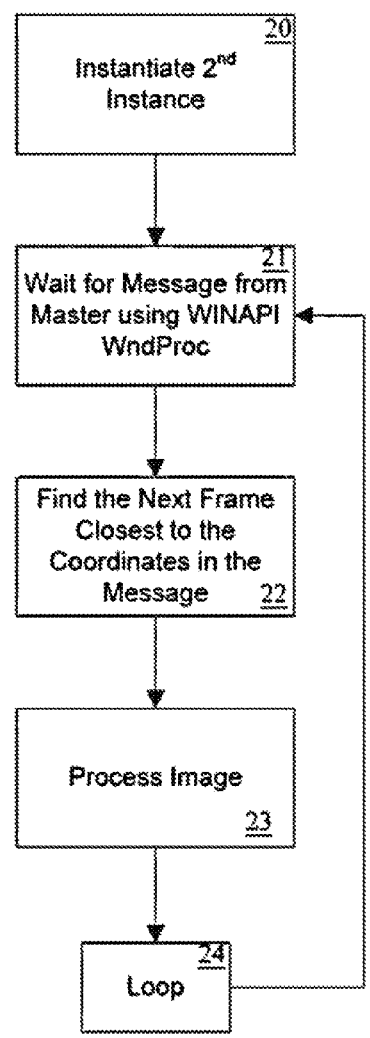

FIG. 2 is a block diagram of the software construct of the present invention. The software comprises a single runtime program capable of multiple runtime instances in corresponding windows 10, 20. For example, the program may comprise a single Java™ program capable of multiple runtime instances in the Java™ Runtime Environment. However, one skilled in the art will readily understand how to convert a Java™ program into a Windows™-based executable program that can be run directly by the Windows™ operating environment, and the current invention should not be limited to any specific programming language or operating environment. In accordance with FIG. 2, at step 10 a first instance of the runtime program is instantiated. This first instance is dubbed the Master Process and a flag is set indicating it to be as such. Each subsequent instantiation of the runtime program automatically checks for an already-running Master Process and, finding one, sets a flag indicating it to be a Slave Process. Any number of Slave Processes may be run. Thus, for example, if a user wishes to view a second video file side-by-side with a first, they may at step 20 instantiate a second instance of the runtime program which is automatically designated a Slave Process. The Master Process will open the master control window 14 of FIG. 1, and the user can open a selected file using the Open EO control. Rather than loading a selected file, one skilled in the art will understand that a live (streaming) geotagged video feed may be selected by master control window 14. Once a video file is loaded the <Prev, Next>, or Play buttons cause the Master Process 10 to proceed at step 11 read the next image frame of the selected video file. At step 12, the Master Process 10 then checks to see if a Slave Process 20 is running. If no Slave Process is running the Master Process essentially acts as a standalone video viewer and proceeds to process the next image at step 14, loading the next frame, and then at step 15 looping back to step 11 to repeat the sequence. However, if a Slave Process 20 is detected the Master Process 10 at step 13 transmits the image/frame coordinates to the Slave Process 20 using a Windows™ API (WINAPI) SendMessage command. The SendMessage command identifies who sent the message (Master Process 10), what the message is (current image/frame coordinates), and includes those coordinates. As described above the Master Process 10 control interface 14 displays file particulars and video characteristics, including current UTC time, GPS longitude, latitude and elevation derived from the XML-tagged georeference data attached to each image frame. The control interface 14 converts the coordinate GPS data from the survey vehicle into adjusted longitude and latitude. The raw GPS data includes longitude, latitude, and elevation measured in degrees up from the horizon (for example, 29.819417, −95.155032 and 277.22652 as seen in FIG. 1 (left)). However, the system used by GPS (WGS84) differs from the one used on published maps by approximately 112 m. Thus, these raw GPS coordinates are converted to true geographic longitude and latitude coordinates from a predetermined mapping system using a known translation algorithm that converts between the WGS84 and other coordinate systems such as the older NAD27 coordinate system (resulting in 29.819066/−95.156748). These adjusted geodetic longitude and latitude values form the payload for the SendMessage command.

At step 21 the Slave Process 20 waits for the Master Process 10 to transmit the image/frame coordinates, and when the WINAPI SendMessage command is received the Slave Process 20 at step 22 searches the loaded video file for the singular frame having adjusted longitude and latitude coordinates most closely matching those transmitted by the Master Process 10. This entails a coordinate matching algorithm based one-to-many (Master-to-Slave) comparison of coordinates that calculates the differential distance from each Master coordinate to each Slave coordinate and then finds the Slave frame at which the coordinates result in the minimum differential distance. This approach accounts for the probability that any of the Master coordinates may not exactly match the Slave coordinates. The array of Slave coordinates is not ordered and so the formula calculates the distance from the given Master coordinate to ALL Slave coordinates and sorts the minimum of the results. Given the minimum result, at step 23 the Slave Process 20 displays the selected "best match"

frame in the slave player(s) 22 (FIG. 1) so that the slave window (22 of FIG. 1) shows the frame most proximately georeferenced by adjusted longitude and adjusted latitude to that shown in the master 12. At step 24 the Slave Process 20 loops back to step 21 and the process repeats. In this manner the slave video player 20 synchronizes its display of frames based on geo-reference information (adjusted latitude and adjusted longitude) rather than time, playing geo-tagged frames bearing the most similar adjusted longitude and adjusted latitude data to the current frame appearing in the master video player 10. The user sees two (or more) side-by-side videos of the very same geographic location at disparate points in time. This effectively facilitates more efficient simultaneous viewing of multiple geo-tagged videos acquired of a common geographical location to allow comparison of oil or gas pipeline Right of Ways (ROWs) to monitor encroachments over time. The invention may also be used in real time while in flight to aid the pilot/observer in identifying threats to pipeline integrity.

If desired, an additional control feature may be provided on the user interface to allow switching between true side-by-side viewing and differential viewing, in which the image presented in the slave player is subtracted from the image presented in the master player. This results in a difference image that may be viewed and/or automatically analyzed (per below) to determine if a threat condition exists.

In accordance with another embodiment of the invention, a scene change detection algorithm is invoked either automatically or through the control interface, and is applied differentially between the first video in master window 12 and second video in slave window 22 for automatic detection of scene changes. There are a variety of common algorithms based on statistical video comparisons that are suitable for this purpose. This enables automatic application of the change detection algorithm to identify changes to pipeline integrity without the need for a human viewer, and is especially well-suited for real-time use in flight.

Threat analysis software may be applied to the results of the above-described change detection algorithm, the differential view, or both to trigger automatic warnings or alerts to encroaching threats to pipeline integrity again without the need for a human viewer.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A system for displaying at least two geo-tagged videos acquired at a common geographical location at a different time, comprising:
   a computer including a processor, non-transitory storage media, and
   a display;
   a software module resident in the non-transitory storage media of said computer for execution by said processor thereof, said module comprising computer instructions stored on said non-transitory computer media for performing the steps of,
   displaying a user interface on said computer display for allowing a user to select a first video comprising a sequence of video frames imaged along a geographic location and each video frame containing geo-reference data corresponding a position at which said frame was taken along said geographic location, and a second geo-tagged video comprising a sequence of video frames imaged along said geographic location and each video frame containing geo-reference data corresponding to a position at which said frame was taken along said geographic location, said first and second geo-tagged videos being acquired along said common geographical location at different times,
   displaying a master video player in a first window on said user interface for playing said first geo-tagged video,
   displaying a slave video player in a second window on said user interface for playing said second geo-tagged video, said second window being adjacent to said first window,
   playing said first geo-tagged video in said first window of said master video player in a chronological frame-by-frame sequence,
   playing said second geo-tagged video in said second window of said master video player in a geo-referenced frame-by-frame sequence in which each frame selected for display in said second window is calculated based on its geo-reference data to have a most proximate adjusted longitude and adjusted latitude to the frame of said first geo-tagged video being displayed in said first window of said master video player,
   whereby said system maintains a geographic correlation between the first geo-tagged video played in said first window of said master video player and the second geo-tagged video played in said second window of said slave video player to identify changes over time at said common geographical location.

2. The system according to claim 1, wherein both said master video player and said slave video player simultaneously display video characteristics of said first and second geo-tagged videos including any one or more from among a group consisting of current UTC time, GPS longitude, GPS latitude and elevation derived from the geo-reference data contained in each said frame.

3. The system according to claim 1, wherein said software module further comprises computer instructions stored on said non-transitory computer media for performing the additional step of converting the geo-reference data of each frame of said second geo-tagged video to adjusted longitude and latitude values.

4. The system according to claim 3, wherein said software module further comprises computer instructions stored on said non-transitory computer media for performing the additional step of converting the geo-reference data of each frame of said first geo-tagged video to adjusted longitude and latitude values.

5. The system according to claim 4, wherein said software module further comprises computer instructions stored on said non-transitory computer media for performing the additional step of comparing the adjusted longitude and latitude values of each displayed frame of said first geo-tagged video to the adjusted longitude and latitude values of all frames of said second geo-tagged video.

6. The system according to claim 5, wherein said software module further comprises computer instructions stored on said non-transitory computer media for performing the additional step of computing a single frame of said second geo-tagged video having adjusted longitude and latitude data most proximate to the adjusted longitude and latitude data of the frame of said first geo-tagged video currently displayed in said first window.

7. The system according to claim 3, wherein said step of converting the geo-reference data of each frame of said second geo-tagged video to adjusted longitude and latitude values comprises converting decimal degrees (DD) to degrees, minutes, and seconds (DMS).

8. The system according to claim 3, wherein said step of converting the geo-reference data of each frame of said second geo-tagged video to adjusted longitude and latitude values comprises converting decimal degrees (DD) to degrees, minutes, and seconds (DMS).

9. The system according to claim 1, wherein said software module comprises computer instructions for performing the additional step of automatically checking for said master video player and, if running, designating subsequent instances slave video processes.

10. The system according to claim 1, wherein said master video player displays frame-by-frame geo-tag information assimilated from said geo-reference data in each frame.

11. The system according to claim 1, wherein the geo-reference data of each frame includes raw GPS longitude, latitude, and elevation measured in degrees up from horizon.

* * * * *